(No Model.) 2 Sheets—Sheet 1.
J. F. DENISON.
SUSPENDED ELECTRIC FAN MOTOR.

No. 516,524. Patented Mar. 13, 1894.

WITNESSES
H. A. Lamb
Pearl M. Reynolds

INVENTOR
Julian F. Denison
By F. M. Wooster
Atty.

(No Model.) 2 Sheets—Sheet 2.

J. F. DENISON.
SUSPENDED ELECTRIC FAN MOTOR.

No. 516,524. Patented Mar. 13, 1894.

WITNESSES
H. A. Lamb
P. M. Reynolds

INVENTOR
Julian F. Denison
By F. H. Wooster
Atty.

UNITED STATES PATENT OFFICE.

JULIAN F. DENISON, OF NEW HAVEN, CONNECTICUT, ASSIGNOR TO THE BACKUS MANUFACTURING COMPANY, OF NEWARK, NEW JERSEY.

SUSPENDED ELECTRIC-FAN MOTOR.

SPECIFICATION forming part of Letters Patent No. 516,524, dated March 13, 1894.

Application filed January 9, 1893. Serial No. 457,728. (No model.)

*To all whom it may concern:*

Be it known that I, JULIAN F. DENISON, a citizen of the United States, residing at New Haven, in the county of New Haven and State of Connecticut, have invented certain new and useful Improvements in Suspension Electric Fans; and I do hereby declare the following to be a full, clear, and exact description of the invention, such as will enable others skilled in the art to which it appertains to make and use the same.

My invention has for its general object to simplify and cheapen the construction of electric fans while at the same time the operation in use shall be greatly improved and the durability increased.

With these ends in view I have devised the simple and novel construction which I will now describe referring by numbers and letters to the accompanying drawings forming part of this specification, in which—

Figure 1:
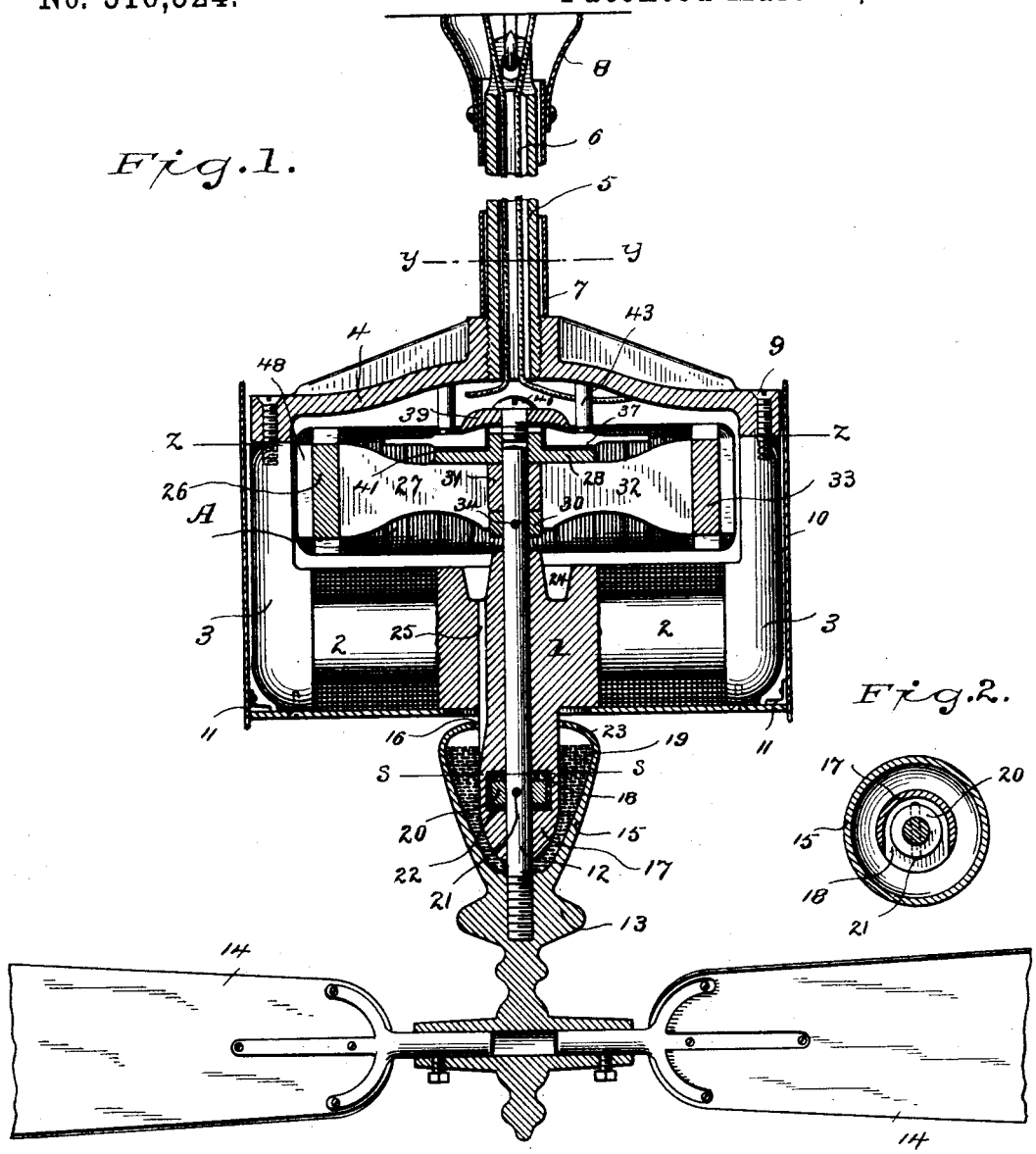
Figure 2:
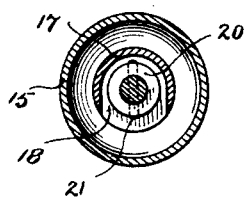
Figure 3:
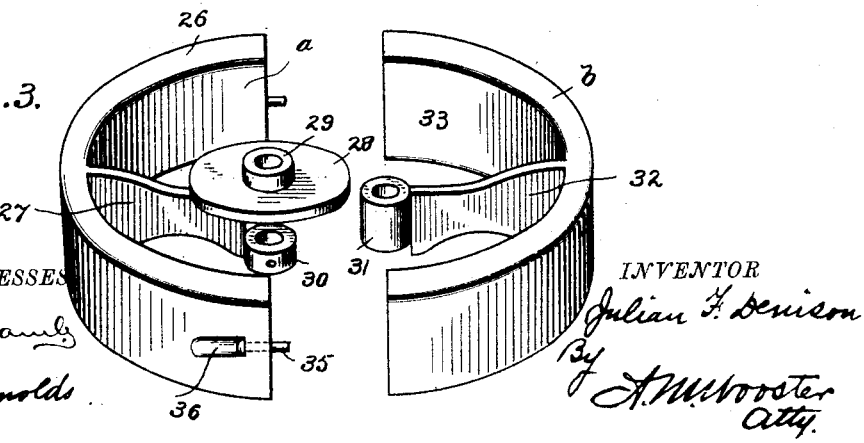
Figure 4:
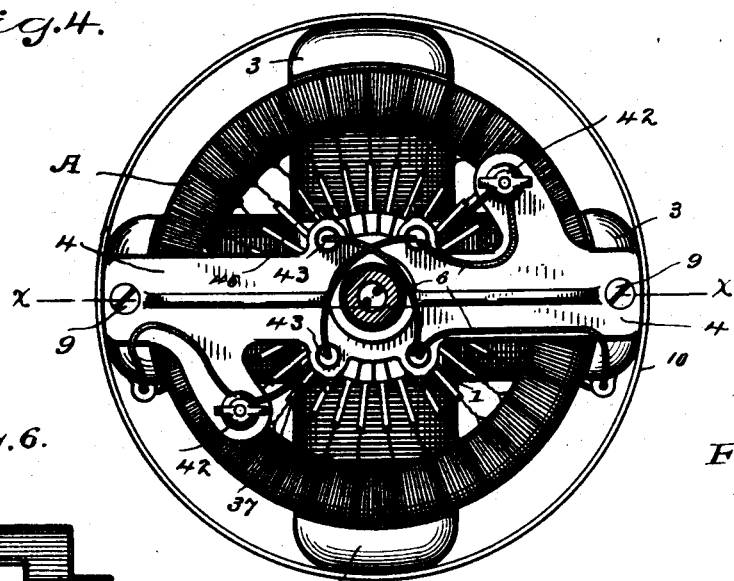
Figure 6:
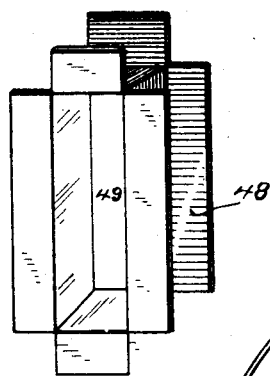
Figure 7:
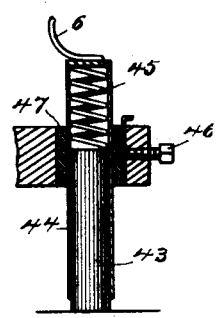
Figure 5:
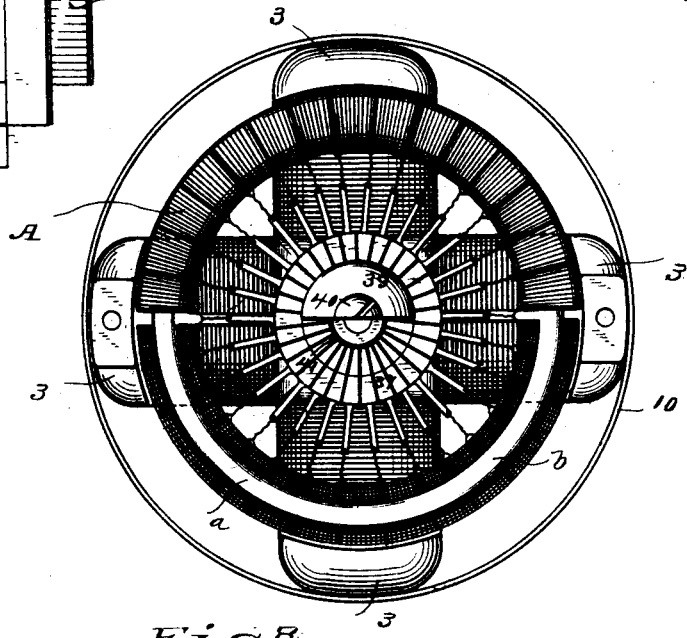
Figure 8:
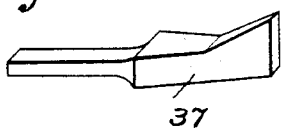

Figure 1 is a vertical section of my novel fan complete the sectional line being indicated by $xx$ in Fig. 4; Fig. 2 a section on the line $ss$ in Fig. 1 looking down; Fig. 3 a perspective of the armature core detached the two sections thereof being separated; Fig. 4 a plan view of my improved fan the hanger being in section on the line $yy$ in Fig. 1; Fig. 5 a section on the line $zz$ in Fig. 1 looking down; Fig. 6 a perspective of one of the armature spools or holders detached; Fig. 7 an enlarged sectional view of one of the carbon brushes, and Fig. 8 is an enlarged perspective of one of the commutator sections detached.

1 denotes a central hub which constitutes the neutral part of the field magnet, 2 the magnet cores and 3 the pole pieces of a four pole magnet. These parts are cast in a single piece which constitutes the framework. The entire device is suspended in place by means of a yoke 4 which is centrally threaded for engagement with the tube 5 through which the wires 6 pass. In practice tube 5 is covered by an outer ornamental sleeve 7, a suitable ornamental piece or rosette 8 being provided at the ceiling. The ends of the yoke are connected to two of the pole pieces by means of screws 9.

It is an important feature of my improved construction that the pole pieces of the field magnet are made relatively narrow as clearly shown in Fig 5, that is to say the width of the pole pieces does not exceed the diameter of the core windings so as to permit of the cores being wound on a machine. In winding the magnet frame is centered in a suitable machine the centers engaging two of the pole pieces. The two core sections in line with each other are then wound after which the frame is given a quarter turn and then centered again, after which the other two core sections are wound. This mode of winding does away with winding by hand thereby greatly reducing the cost of production. 10 denotes a suitable case which may be made in any suitable manner and is attached to the pole pieces. I have shown the sides and bottom of the case as made in separate pieces and secured together by angle pieces 11.

12 denotes the shaft and A the armature which is carried thereby and the special construction of which I shall presently describe. The lower end of the shaft is threaded and engages a head 13 in which the fan blades 14 are secured by set screws or in any suitable manner. The thread upon the shaft and the corresponding thread in the head are so cut that rotation of the shaft tends to tighten the head thereon continually, thus insuring that the head will not come off in use and dispensing with the use of set screws to secure the head in place, a backward turn of the head being all that is required to remove it from the shaft should its removal be required. Above the head and preferably cast integral therewith is an oil reservoir 15 having an opening 16 in its top to receive a downward extension 17 of hub 1. In addition to its other functions which I shall presently describe extension 17 gives a long bearing to the shaft whereby it is firmly supported and caused to run steadily in use. In the lower end of the extension I provide a recess 18 which extends inward from one side, see Fig. 2. In filling the oil reservoir, sufficient oil, which I have denoted by 19, see Fig. 1, is poured in so that recess 18 will be at all times submerged in oil.

20 denotes a steel collar on the shaft which is secured thereto by a pin 21 passing through both collar and shaft. This collar in use rests upon a vulcanized fiber washer 22 which lies on the bottom of the recess and which is provided with a central opening through which the shaft passes. The bearing of the steel collar on the vulcanized fiber washer, both parts being submerged in oil is the sole bearing for all the operative parts of the device, the entire weight being supported by the collar which bears upon the washer.

It is of course well understood that in using any machine, oil always tends to work out at the ends of the journal bearings, this being true whether the shafts are placed vertically or horizontally. It has been a serious objection to various kinds of electric fans as heretofore constructed that it was impossible to prevent the dropping of oil, which has caused serious inconvenience and not infrequently considerable damage. My present construction entirely obviates this objection and renders it practically impossible for oil to drop from the fan under any circumstances. The top of the reservoir curves inward as at 23 so that should oil rise up the inner surface of the reservoir under any circumstances it can only reach opening 16 and must then drop back into the reservoir as it cannot pass the opening. In use there is of course a constant passage of oil upward between the shaft and its bearing in hub 1 and extension 17. As soon as it works upward to the top of the hub this oil passes into a groove 24 from the bottom of which a passage 25 leads down into the reservoir again so that as a matter of fact the oil is used over and over again without serious waste and without the possibility of any oil escaping from the reservoir or from any part of the device and dropping down upon the carpet or whatever may be under the fan.

The armature core consists of two sections which are in practice solid iron castings and which I have designated specifically by $a$ and $b$, the use of separate plates in the armature core being entirely dispensed with. Section $a$ consists of a half rim 26 having an arm 27 extending inward from the center of the half rim to the center of the core, a central disk 28 having a hub 29 and an eye 30 below the disk, there being a space between the disk and eye to receive an eye 31 on an arm 32 which extends inward from the half rim 33 of section $b$. In assembling the two castings are placed together, the ends of the half rims registering and eye 31 lying between eye 30 and disk 28 in which position the shaft is passed through the eyes, disk and hub 29 and the parts are secured together by a pin 34 which passes through eye 30 and the shaft. The ends of the half rims are retained in position relatively to each other, i. e. in alignment, by means of pins 35 which engage holes in the ends of the half rims, sockets 36 being provided, one only being shown, to permit the pins to be driven to place. The commutator consists of a series of arms 37 made narrowest and highest at their inner ends which rest upon disk 28 and are held in place by a cap 39 held in position by a screw 40 which engages hub 29 as clearly shown in Fig. 1, the commutator arms being insulated from each other and from the disk and cap by suitable washers or plates 41.

42 denotes the binding posts and 43 carbon brushes carried by cases 44 and held in operative position by springs 45 within the cases. The cases pass through holes in yoke 4 and are held in operative position by set screws 46, insulating sleeves 47 being placed between the cases and the yoke.

It will be seen that the construction of the armature core just described reduces the cost of production to the minimum. In order that the windings may be produced with equal relative cheapness, and hand winding be entirely dispensed with I provide spools or holders 48 made of paper or other suitable insulating material upon which the windings are placed.

So far as the principle of my invention is concerned it makes no difference of what kind of insulating material the spools or holders are made, I preferably however make them from single strips of pasteboard which are pressed to the required shape by a machine, the process of making them being similar to the process of making paper boxes and forming no portion of my present invention, it simply being necessary that each spool or holder be provided with a central opening 49 and that the spools or holders as a whole be so formed as to permit them to slide readily upon the half rims of the sections of the armature core and conform to the curvature thereof. The spools or holders are placed in a suitable machine and a number of them wound at a time, after which they are placed upon the half rims of the two castings constituting the armature core and the castings are secured together as already described. I thus wholly avoid the slow and expensive process of hand winding and the use of special insulating washers in the armature as the holders themselves serve to perfectly insulate the windings. The ends of two contiguous windings are attached to each commutator section as clearly shown in Figs. 4 and 5.

It will of course be understood that the details of construction may be varied within reasonable limits without departing from the spirit of my invention.

Having thus described my invention, I claim—

1. The hub having groove 24, passage 25, and extension 17 having recess 18, in combination with a shaft, an oil reservoir at the lower end of said shaft which receives the extension, and a bearing collar secured to the shaft and lying within said recess.

2. The combination with the hub and extension 17 having recess 18, of an oil reservoir which receives the extension, the shaft passing through said hub, extension and oil reservoir and having a bearing collar lying within said recess, and a washer lying between said collar and the bottom of the recess.

3. The combination with the hub and extension 17 having recess 18, of the shaft threaded at its lower end, a head threaded to engage the shaft, an oil reservoir formed in the head, and a bearing collar on the shaft lying within said recess.

4. The hub having groove 24, and passage 25, and extension 17 having recess 18, in combination with the shaft journaled in said hub and extension and having a bearing collar lying in said recess, and an oil reservoir the top of which is inwardly curved leaving a central opening 16 through which the extension passes, but is not in contact therewith so that oil cannot escape from the reservoir at the central opening and oil which works up the shaft will pass into the groove in the top of the hub and through passage 25 down into the reservoir again.

5. The armature core comprising two castings each casting consisting of a half rim and an arm extending inward from the center of the half rim and provided with an eye through which the shaft passes.

6. The armature core comprising two castings $a$ and $b$, casting $a$ consisting of a half rim 26 having an arm 27 extending inward from the center thereof and at the inner end of said arm a disk 28 having a hub 29, and an eye 30, and casting $b$ consisting of a rim 33 having an arm 32 extending inward from the center thereof and an eye 31 at the inner end of said arm, said castings being secured together by a shaft which passes through the hub, disk and eyes, and the half rims being held in alignment by pins 35.

7. The armature consisting of two castings each casting having an arm extending inward and an eye at the inner end of the arm to receive a shaft, and independent armature windings having central openings to receive the half rims substantially as described.

8. The combination with sections $a$ and $b$ of the armature core each section having a suitable half rim, of armature windings each winding being on an independent spool or holder made of insulating material and provided with a central opening to receive one of the half rims.

9. In combination, the armature core comprising two sections having half rims with arms extending inward therefrom said arms having eyes to receive the shaft and one of said arms having a disk 28 and a hub 29, armature windings, a commutator comprising arms 37 the inner ends of which rest on said disk, a cap 39 engaging the inner ends of the arms, and a screw engaging the hub by which the cap and arms are secured in place.

10. The combination with the field magnet, the armature cast in two sections one of which is provided with a disk 28, and hub 29, and the brushes, of a commutator consisting of a series of arms the inner ends of which are made narrowest and highest, a cap 39 engaging the inner ends of the arms, and a screw engaging the hub whereby the cap and arms are held in place.

In testimony whereof I affix my signature in presence of two witnesses.

JULIAN F. DENISON.

Witnesses:
HARRY W. ASHER,
GEORGE T. GEARY.